(12) United States Patent
Meyer

(10) Patent No.: US 7,162,935 B2
(45) Date of Patent: Jan. 16, 2007

(54) CRANKSHAFT COUPLING STRUCTURE FOR ENGINE

(76) Inventor: Siegfried Meyer, Spitalgasse 1, 86732 Oettingen (DE)

( * ) Notice: Subject to any disclaimer, the term of this patent is extended or adjusted under 35 U.S.C. 154(b) by 462 days.

(21) Appl. No.: 10/772,455

(22) Filed: Feb. 6, 2004

(65) Prior Publication Data

US 2004/0187631 A1    Sep. 30, 2004

(51) Int. Cl.
*F16C 7/06*    (2006.01)
(52) U.S. Cl. ..................... 74/586; 123/197.4
(58) Field of Classification Search ........... 74/579 R, 74/586, 593, 600, 601, 602, 595, 594.1, 594.3; 123/197.4, 197.3, 48 B
See application file for complete search history.

(56) References Cited

U.S. PATENT DOCUMENTS 5,060,603 A * 10/1991 Williams ............... 123/78 BA

* cited by examiner

*Primary Examiner*—Richard M. Lorence
*Assistant Examiner*—Edwin A. Young
(74) *Attorney, Agent, or Firm*—Rosenberg, Klein & Lee

(57) ABSTRACT

A crankshaft coupling structure used in an engine and coupled between a piston and a crankshaft to enhance the output torque of the engine is disclosed to include connector pivoted to the crankshaft, the connector having a radially extended and smoothly arched sliding slot, and a coupling rod member, the coupling rod member having a top end pivoted to the piston and a bottom end pivotally mounted with a roller assembly coupled to the sliding slot of the connector and movable between two distal ends of the sliding slot upon reciprocating motion of the piston.

1 Claim, 4 Drawing Sheets

CRANKSHAFT COUPLING STRUCTURE FOR ENGINE

BACKGROUND OF THE INVENTION

1. Field of the Invention

The present invention relates to an internal combustion end and, more specifically, to a crankshaft coupling structure for use in an engine to connect a crankshaft to a piston and to increase the output torque of the engine.

2. Description of the Related Art

In a typical internal combustion engine, as shown in FIG. 1, of the type found in most vehicles today, a plurality of pistons are respectively movably mounted in a plurality of cylinders formed in an engine block. Each of the pistons has one end connected with a piston rod and the other end coupled to a crankshaft. When spark plugs in the engine block fire to ignite fuel mixture, the pistons are driven downward to turn the crankshaft, which ultimately drives the entire vehicle. At present, in a typical engine, connecting rods are used and connected with the respective first end to the corresponding piston and the respective second end to the corresponding crankshaft. The connecting points between the two ends of each connecting rod and the corresponding piston and corresponding crankshaft are disposed at the ends of the longitudinal center axis of the respective connecting rod. By means of the coupling of the connecting rod between the corresponding piston and the corresponding crankshaft, reciprocating motion of the piston causes the corresponding crankshaft to rotate.

Presently, researchers have reported many studies to enhance the output torque by extending the moving distance of the connecting rods between the pistons and the crankshafts.

SUMMARY OF THE INVENTION

The present invention has been accomplished under the circumstances in view. It is one object of the present invention to provide a crankshaft coupling structure for an engine, which greatly enhances the output torque of the engine.

It is another object of the present invention to provide a crankshaft coupling structure for use in an engine, which saves fuel consumption of the engine.

It is still another object of the present invention to provide a crankshaft coupling structure for an engine, which improves the performance of the engine, resulting in reduced amount of solid matter in exhaust gas of the engine.

To achieve these and other objects of the present invention, the crankshaft coupling structure is installed in an engine and coupled between a piston and a crankshaft, comprising connector pivoted to the crankshaft, the connector having a radially extended and smoothly arched sliding slot, a coupling rod member, the coupling rod member having a top end pivoted to the piston and a bottom end inserted into the sliding slot of the connector, and a coupling member fastened pivotally with the bottom end of the coupling rod member and received in the sliding slot and movable with the coupling rod member between two distal ends of the sliding slot.

BRIEF DESCRIPTION OF THE DRAWINGS

The accompanying drawing is included to provide a further understanding of the invention, and is incorporated in and constitutes a part of this specification. The drawing illustrates an embodiment of the invention and, together with the description, serves to explain the principles of the invention. In the drawing.

DETAILED DESCRIPTION OF THE PREFERRED EMBODIMENT

Figure 1:
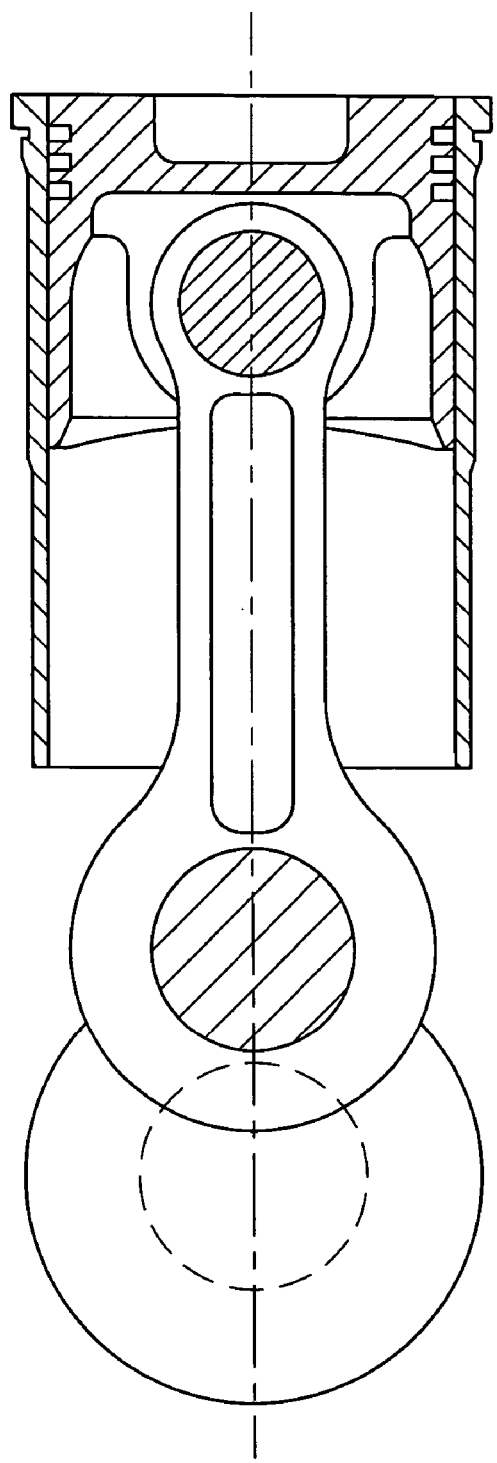
FIG. 1 is a sectional view showing the crankshaft coupling structure coupled between a piston and a crankshaft according to the prior art.

Reference will now be made in detail to the preferred embodiment of the present invention, examples of which are illustrated in the accompanying drawings. Wherever possible, the same reference numbers are used in the drawings and the description to refer to the same or like parts.

Figure 2:
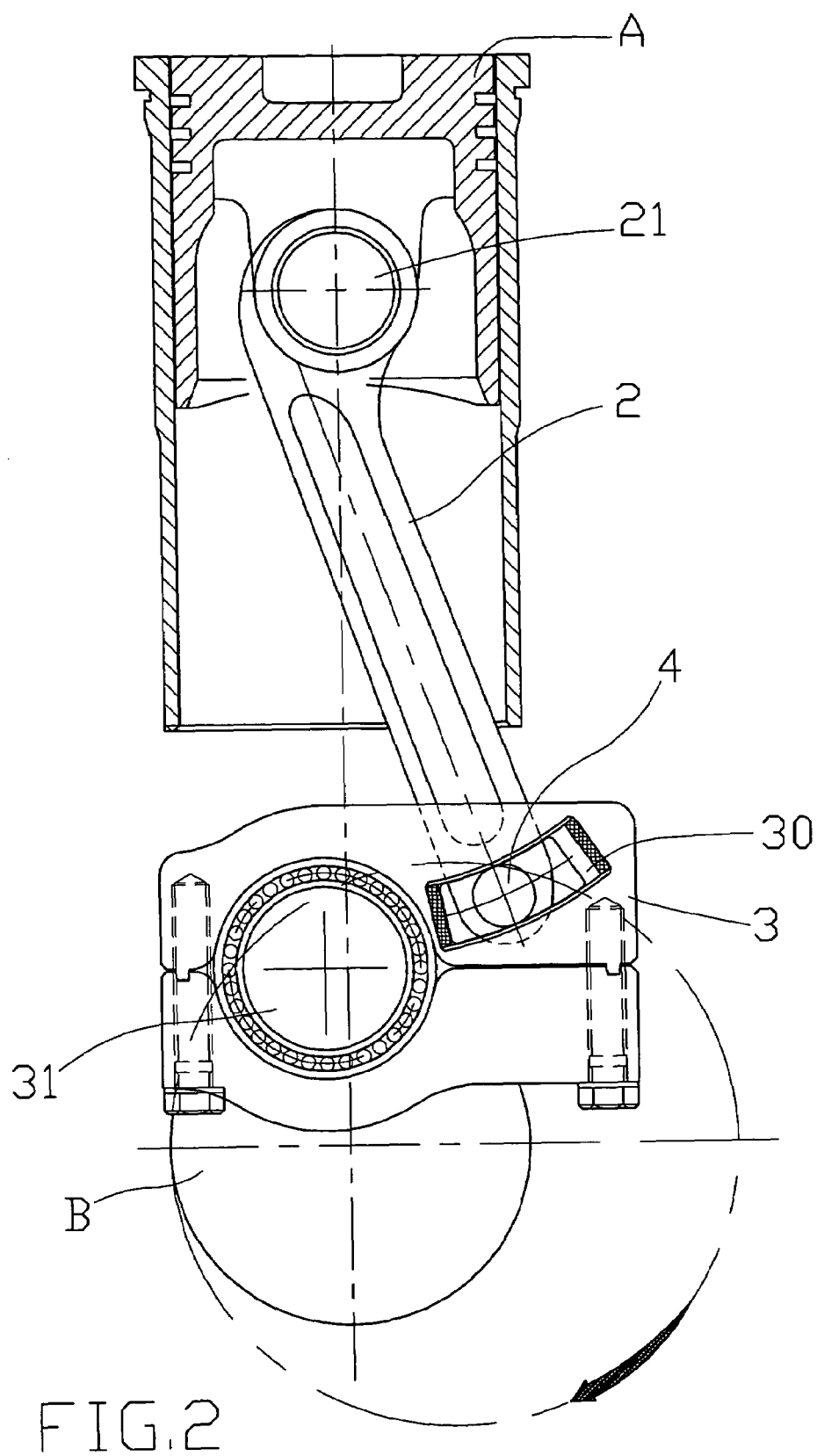
FIG. 2 is a schematic drawing showing the action of the crankshaft coupling structure according to the present invention.
Figures 3A, 3B:
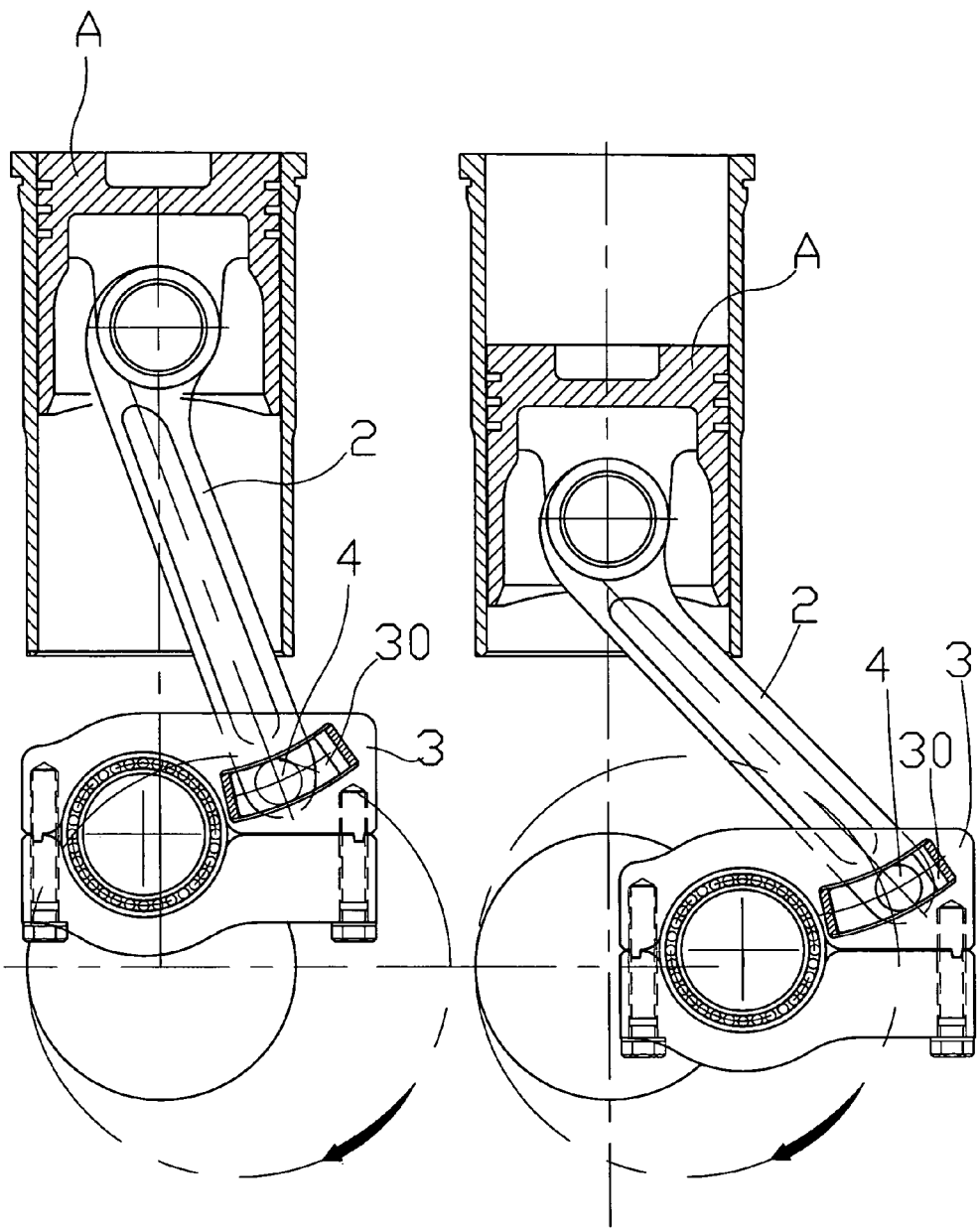
FIGS. 3A~3D are schematic drawings showing one moving cycle of the crankshaft coupling structure with the piston from the top dead center to the bottom dead center and then from the bottom dead center back to the top dead center according to the present invention.
Figures 3C, 3D:
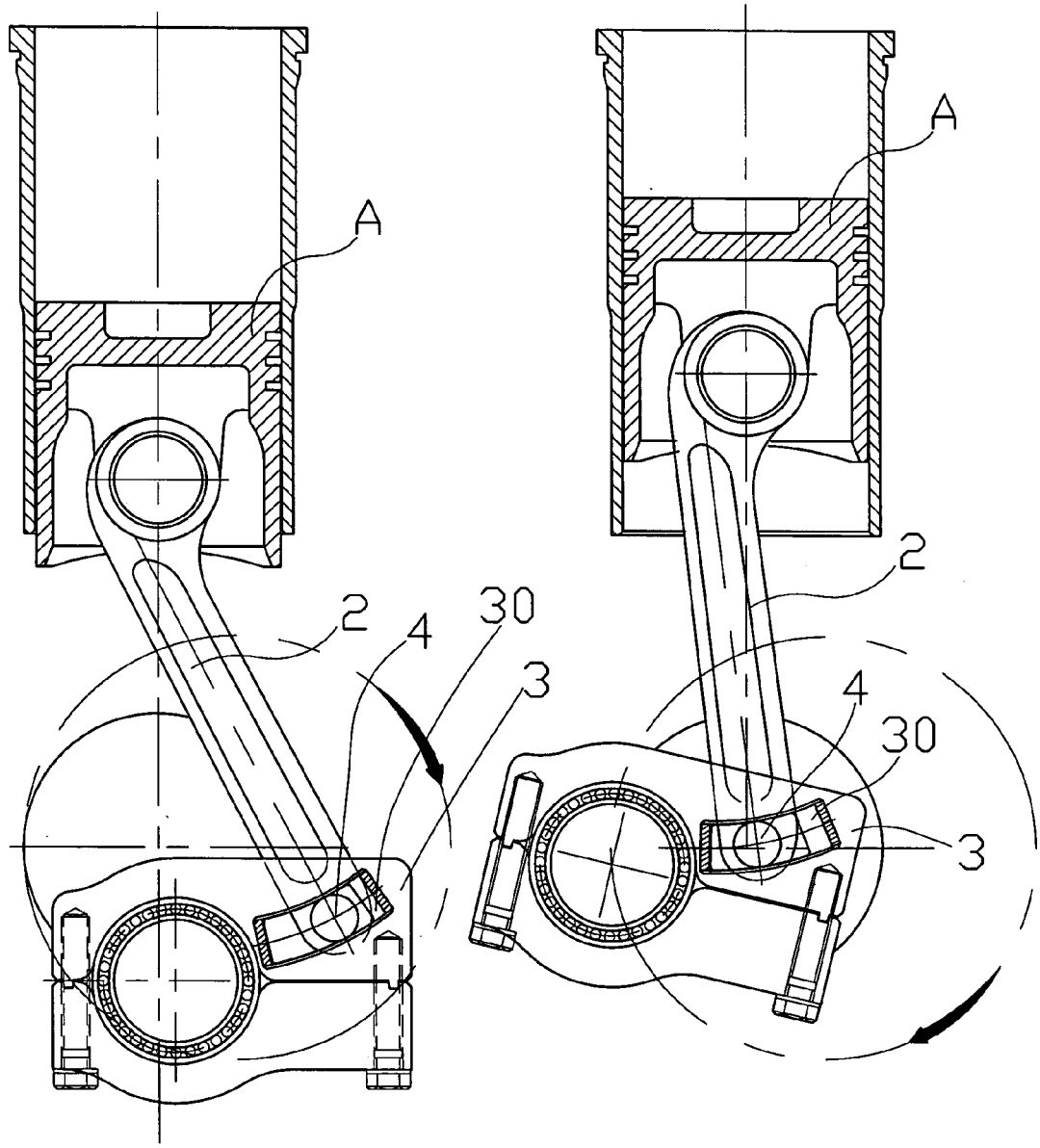

Referring to FIGS. 2 and 3, a crankshaft coupling structure is shown comprised of a coupling rod member 2, a connector 3, and roller assembly 4.

The connector 3 is pivoted to a crankshaft B by a pivot pin 31, having a radially extended smoothly arched sliding slot 30.

The coupling rod member 2 has a top end pivoted to a piston A by a pivot pin 21, and a bottom end inserted into the sliding slot 30 of the connector 3.

The roller assembly 4 is fastened pivotally with the bottom end of the coupling rod member 2, and rotatably supported in the sliding slot 30.

During reciprocating motion of the piston A, the roller assembly 4 is forced to move with the coupling rod member 2 between two distal ends of the sliding slot 30. When the roller assembly 4 moves to the right end of the sliding slot 30, the coupling rod member 2 gives no pressure to the connector 3 and the crankshaft B. On the contrary, when the roller assembly 4 moving with the coupling rod member 2 from the right end of the sliding slot 30 to the left end of the sliding slot 30, the coupling rod member 2 imparts a pressure to the connector 3 and the crankshaft B, accelerating rotary motion of the crankshaft B.

Referring to FIGS. 3A~3D, when the crankshaft coupling structure moves with the piston A to the top dead center in the combustion engine, the roller assembly 4 stays at the left end of the sliding slot 30 in the connector 3. During the down stroke of the piston A from the top dead center in the combustion engine toward the bottom dead center, the roller assembly 4 is moved from to left end of the sliding slot 30 toward the right end of the sliding slot 30. On the contrary, during up stroke of the piston A from the bottom dead center in the combustion engine toward the top dead center, the roller assembly 4 is moved from the right end of the sliding slot 30 toward the left end of the sliding slot 30. Therefore, the invention extends the stroke of the coupling rod member 2, enhancing the output torque of the engine.

As indicated above, the crankshaft coupling structure of the present invention uses a roller assembly to couple a coupling rod member, which is pivoted to the piston, to a connector, which is pivoted to the crankshaft, by a slip joint. This arrangement greatly enhances the output torque of the engine. Because the invention greatly improves the performance of the engine, it makes the engine to save fuel consumption and to reduce waste gas production.

A prototype of crankshaft coupling structure for engine has been constructed with the features of FIGS. 1~3. The crankshaft coupling structure for engine functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A crankshaft coupling structure used in an engine and coupled between a piston and a crankshaft to enhance the output torque of the engine, comprising:
 a connector pivotally connected to said crankshaft, said connector having a radially extended sliding slot spaced laterally from said pivotal connection to said crankshaft;
 a coupling rod member, said coupling rod member having a top end pivotally connected to said piston; and
 a coupling member fastened pivotally to a bottom end of said coupling rod member and received in said sliding slot, said coupling member being reciprocatingly movable with said coupling rod member between two distal ends of said sliding slot for varying an eccentricity of said coupling of said coupling rod member to said crankshaft, said coupling member being displaced to a first of said two distal ends having a minimum eccentricity during an up stroke of said piston and displaced to a second of said two distal ends having a maximum eccentricity during a down stroke of said piston to thereby increase the output torque of said engine.

* * * * *